(12) United States Patent
Maccarone

(10) Patent No.: US 6,742,925 B2
(45) Date of Patent: Jun. 1, 2004

(54) METHOD AND APPARATUS FOR VERIFYING ACCURACY OF AN INFRARED THERMOMETER

(75) Inventor: Wilhelm Maccarone, Beloeil (CA)

(73) Assignee: Cole-Parmer Instrument Company, Vernon Hills, IL (US)

(*) Notice: Subject to any disclaimer, the term of this patent is extended or adjusted under 35 U.S.C. 154(b) by 0 days.

(21) Appl. No.: 09/992,318

(22) Filed: Nov. 19, 2001

(65) Prior Publication Data

US 2003/0095583 A1 May 22, 2003

(51) Int. Cl.$^7$ .............................. G01K 15/00; G01J 5/00
(52) U.S. Cl. ................................ 374/2; 374/1; 374/121
(58) Field of Search ..................... 374/1–2, 9, 120–121, 374/129; 250/252.1, 363.09, 370.15, 332

(56) References Cited

U.S. PATENT DOCUMENTS

| | | | |
|---|---|---|---|
| 3,348,408 A | * 10/1967 | Engborg | 374/2 |
| 3,631,708 A | * 1/1972 | Ensor | 374/2 |
| 3,694,624 A | * 9/1972 | Buchta | 374/2 |
| 4,885,463 A | * 12/1989 | Wellman et al. | 250/252.1 |
| 5,324,937 A | * 6/1994 | Chen et al. | 250/252.1 |
| 6,193,411 B1 | * 2/2001 | Chen | 374/2 |
| 6,232,614 B1 | * 5/2001 | Christy et al. | 250/504 R |
| 6,390,668 B1 | * 5/2002 | Materna | 374/2 |

FOREIGN PATENT DOCUMENTS

| | | | | |
|---|---|---|---|---|
| GB | 2184861 A | * | 7/1987 | G01K/15/00 |
| JP | 0101727 | * | 6/1982 | 374/1 |
| SU | 0386282 | * | 6/1973 | 374/1 |

OTHER PUBLICATIONS

Scholl. Temperature Calibration of an Infrared Radoation Source. Applied Optics. vol. 19. No. 21, Nov. 1980.*
"Handheld Infrared Calibrator Model 9131", ALPHA Control and Intrumentation Homepage, (2001).
"Affordable 3–Point Infrared Calibrator Model 9135", Temperature Calibration and Measuring Equipment, Hart Scientific Homepage, (2001).
"LABCOR Calibration Services", LABCOR Inc., no date.
Cole–Parmer Catalogue, Cole–Parmer Instrument Company, pp. 1836 and 1932, no date.

* cited by examiner

Primary Examiner—Gail Verbitsky
(74) Attorney, Agent, or Firm—Rader, Fishman & Grauer LLP

(57) ABSTRACT

The verification of accuracy of an IR thermometer is provided at any temperature in the range of –25° C. to +100° C., preferably at the room temperature. The magnetic surface of a thermo-conductive mat of the present invention is applied to any metallic surface in a room. The user waits to give the contact thermometer arranged on the mat time to reach thermal equilibrium, and then aims the beam of the IR thermometer at the black body target on the mat. The reading of the IR thermometer is then compared with the reading of a contact thermometer, which is attached to the mat adjacent to the black body target. The lightweight, portable, low-cost temperature verification mats of the present invention can be used for verification of IR thermometers in different customer environments, such as in industrial environments, and with retail equipment, or home appliances, including ovens and freezers, etc.

25 Claims, 3 Drawing Sheets

METHOD AND APPARATUS FOR VERIFYING ACCURACY OF AN INFRARED THERMOMETER

BACKGROUND OF THE INVENTION

The invention relates to a temperature verification device and method, which is used to verify accuracy of temperature measurements by an infrared thermometer.

DESCRIPTION OF THE RELATED ART

Remote infrared temperature measuring devices, or infrared (IR) thermometers, have been used for many years to measure temperature of a surface from a remote location. Their principle of operation is well known. All surfaces at a temperature above absolute zero emit heat in the form of radiated energy. This radiated energy is created by molecular motion which produces electromagnetic waves. Thus, some of the energy in the material is radiated in straight lines away from the surface of the material. Many infrared thermometers use optical reflection and/or refraction principles to capture the radiated energy from a given surface. The infrared radiation is focused upon a detector, analyzed, and processed; the temperature is calculated and presented on a display.

In temperature control equipment used in such fields as food retail industry or pharmaceutical industry, etc., where IR non-contact thermometers are often used, it is desirable to obtain reasonably accurate temperature measurements. To verify the accuracy of an IR thermometer, it is known that one may check the temperature readings at different pre-set temperature points using a black body target.

The strength of infrared rays radiating from the surface of the black body depends upon temperature and emissivity of the surface as defined by the Planck quantum theory. The black body in physics is an ideal black substance that absorbs all and reflects none of the radiant energy falling on it. In known IR calibration devices, the infrared sensor measures the strength of the infrared radiation from the black body having a known temperature thereby to perform calibration on the basis of the relationship between the voltage output from the infrared sensor and the temperature of the black body. The emissivity of the black body in calibration devices is usually 0.9–0.95.

A known Hart's portable infrared calibrator (FIG. 1) includes a black-body target, a temperature controller and a built-in heating unit, which can be set to three temperature set points, such as 50° C., 100° C. and 150° C. Another Hart's calibrator has set points of 100° C., 250° C. and 400° C. The calibration is provided by enabling the built-in heating unit, selecting a set point temperature of the black body target, waiting for several minutes for the heater to reach the pre-set temperature, aiming the IR thermometer at the black body target and comparing the temperature of the thermometer with the calibrator's set temperature. This type of calibrator is mostly used for IR thermometers working with temperatures higher than the ambient temperature, and has the following drawbacks: the calibration is limited to several pre-set points, and the procedure is time consuming because of the heating and cooling. For example, a typical heating time for a calibrator of this type is about 3–15 min., stabilization time is about 3 min. and cooling time is about 25 min. Such a calibrator also needs AC power for the heating unit with current of about 1–1.5A. The accuracy and reliability of the calibrator depends on respective characteristics of its parts, such as heating unit, controller, etc. The device is relatively expensive because of the combined cost of its parts.

Therefore, there is a need for a simple, low-cost reliable portable verification device, which can provide a fast temperature verification of IR thermometers with sufficient accuracy in a broad temperature range not limited by a number of set points.

SUMMARY OF THE INVENTION

A portable temperature verification device of the present invention includes at least one thermo-conductive mat adapted to verify accuracy of IR thermometers. The verification mat comprises a sheet of thermo-conductive material having front and back opposing surfaces, a black body target on said front surface of the sheet, which black body target is used as a source of infrared radiation for the IR thermometer, and a contact thermometer arranged on said front surface adjacent to the black body target for comparison with the reading of the IR thermometer focused on the target. The back flat surface of the mat is releasably attachable to an object having a desirable temperature for temperature verification. For this purpose the mat may have a magnetized metallic coating or a thermo-conductive adhesive coating on the back surface. In another embodiment, the mat is made from a flexible thermo-conductive magnetic material. In yet another embodiment the mat is rigid and self-adhesive.

The range of temperatures that may be verified with the use of the mat of the present invention depends on the working environment of the IR thermometer and may be between about −25° C. and about +100° C. More preferably, the range is from −14° C. to +31° C., or, when used for a freezer and the like, it is from −25° C. to −3° C. For a refrigerator, the IR thermometer is verified in the range of 0° C. to +12° C., and for ambient temperatures the range is +14° C. to +31° C.

The contact thermometer may be of any type, including a reversible liquid crystal temperature label or a color-changing temperature indicator. The thermometer may be built-in, or it may be releasably attached to the front surface of the mat. In the latter case, it may have a thermo-conductive self-adhesive coating on its back side, or it may have a magnetic coating on the back side, or it may be releasably mounted on the front surface of the mat by any appropriate means for this purpose. The removable contact thermometer of another embodiment is interchangeable with another contact thermometer, which may be chosen based on desired temperature range from a set of releasably attachable contact thermometers. The set including a plurality of contact thermometers for different temperature ranges may be provided by packaging the thermometers for sale with the mat or a set of mats, for which the thermometers are to be used. Each mat in the set is adapted to verify accuracy of IR thermometers within a different temperature range. The mat and/or the thermometer is then selected by a purchaser or user in accordance with the temperature of the environment where the mat with the contact thermometer is to be used.

A method for verifying accuracy of an IR thermometer includes providing a thermo-conductive mat having a black body target and an adjacent contact thermometer thereon, releasably attaching the mat to an object having a desirable temperature, aiming the IR thermometer at said black body target, and comparing the reading of the IR thermometer with the reading of said contact thermometer. When the temperature range is changed, the contact thermometer on the mat may be changed for another based on the desired temperature range. Also, a plurality of thermo-conductive mats may be provided for different temperature ranges, and a mat may be chosen based on the desirable temperature range for verification of an IR thermometer.

DETAILED DESCRIPTION OF THE EMBODIMENTS

In the following description, for purposes of explanation and not limitation, specific details are set forth, such as numbers, dimensions, shapes etc. in order to provide a thorough understanding of the present invention. However, it will be apparent to one skilled in the art that the present invention may be practiced in other embodiments that depart from these specific details.

Figure 1:
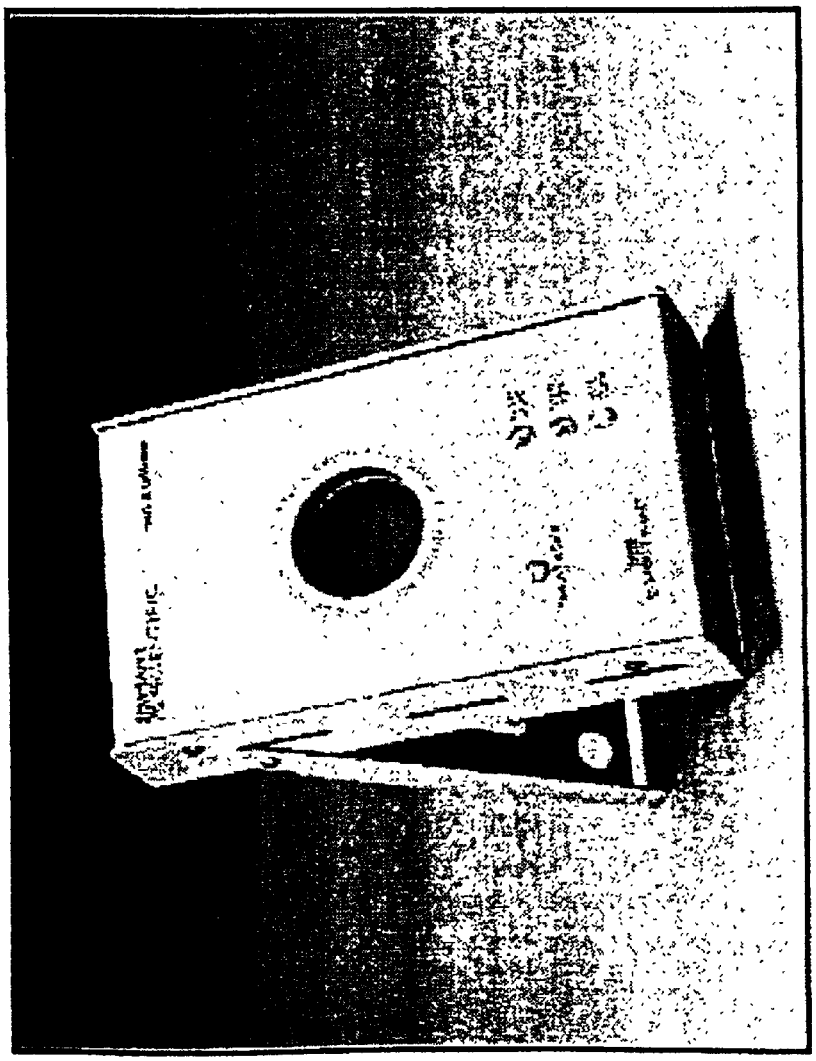
FIG. 1 shows a prior art portable IR calibrator.
Figure 2:
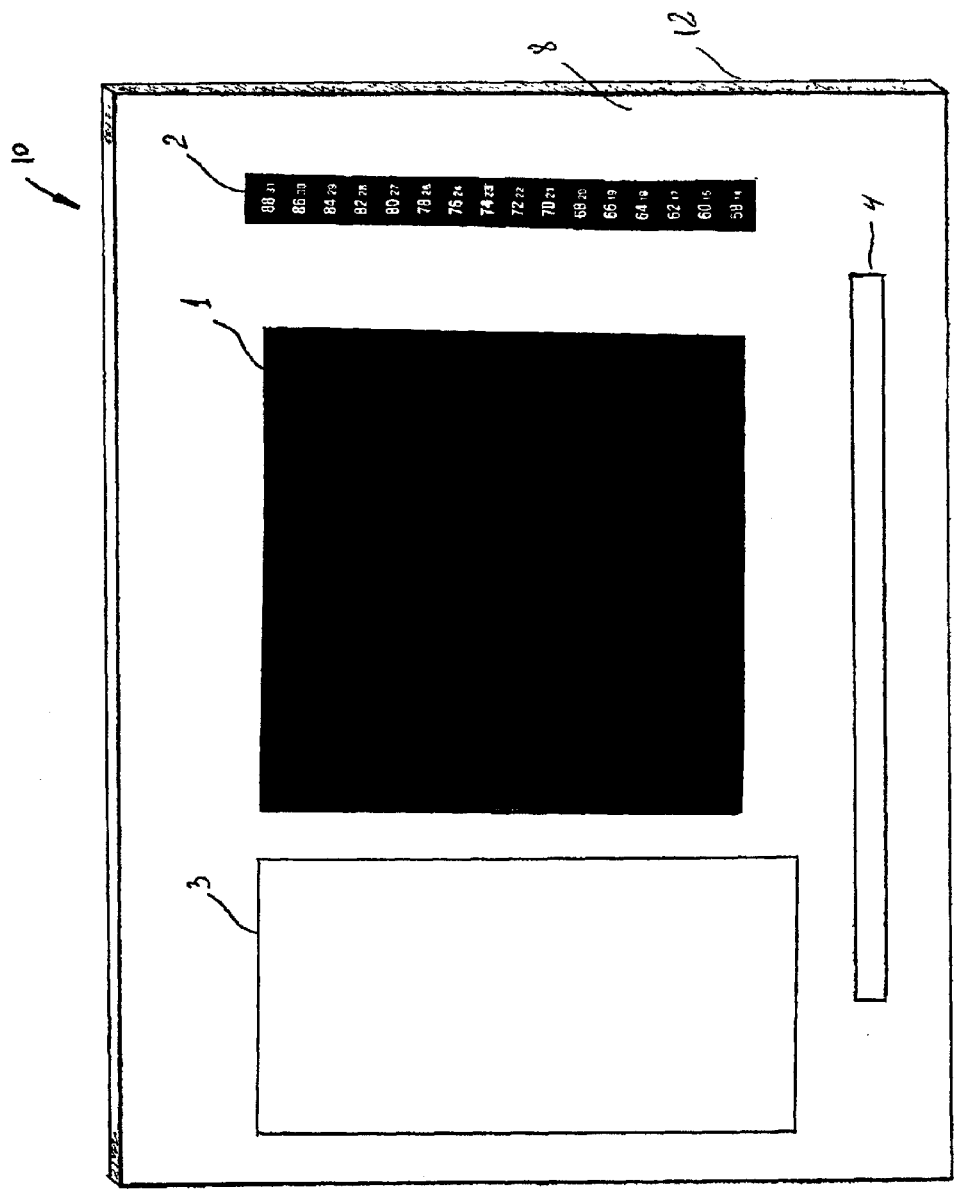
FIG. 2 is a schematic drawing of a temperature verification mat of the present invention with a rectangular shaped black body target and a liquid crystal contact thermometer.

Referring now to drawings, FIG. 2 illustrates a temperature verification mat of a preferred embodiment of the present invention. The mat 10 comprises a flat magnetic sheet made of magnetized vinyl with front surface 8 and an opposite back surface 12. The mat has dimensions of 6.75"× 5.1875"×0.04". A rectangular flat black body target 1 with dimensions 3"×3" is positioned on the front surface 8 of the mat, and a contact thermometer 2 is arranged on the surface 8 adjacent to the black body target. In the preferred embodiment the contact thermometer 2 is a thermo-chromic liquid crystal thermometer attached by a thermo-conductive glue to the front surface 8 of the sheet. The liquid crystals of the contact thermometer 2 change color according to the temperature. The contact thermometer 2 shown in FIG. 2 has a temperature range from +14° C. to +31° C. (58° F. to 88° F.) with an accuracy of ±1° C. (±2° F.), and the mat is used to verify the IR thermometer at room temperature.

The mat surface 8 may also include an area 3 for user's instructions and an area 4 for placing the manufacturer's information.

It is appreciated that the black body target may have different shapes, such as round, oval, elliptic, etc. and different sizes, the dimensions depending on size of the mat and the design of the surface 8 of the mat. The contact thermometers may also vary depending on temperature range, work conditions and accuracy requirements.

Figure 3:
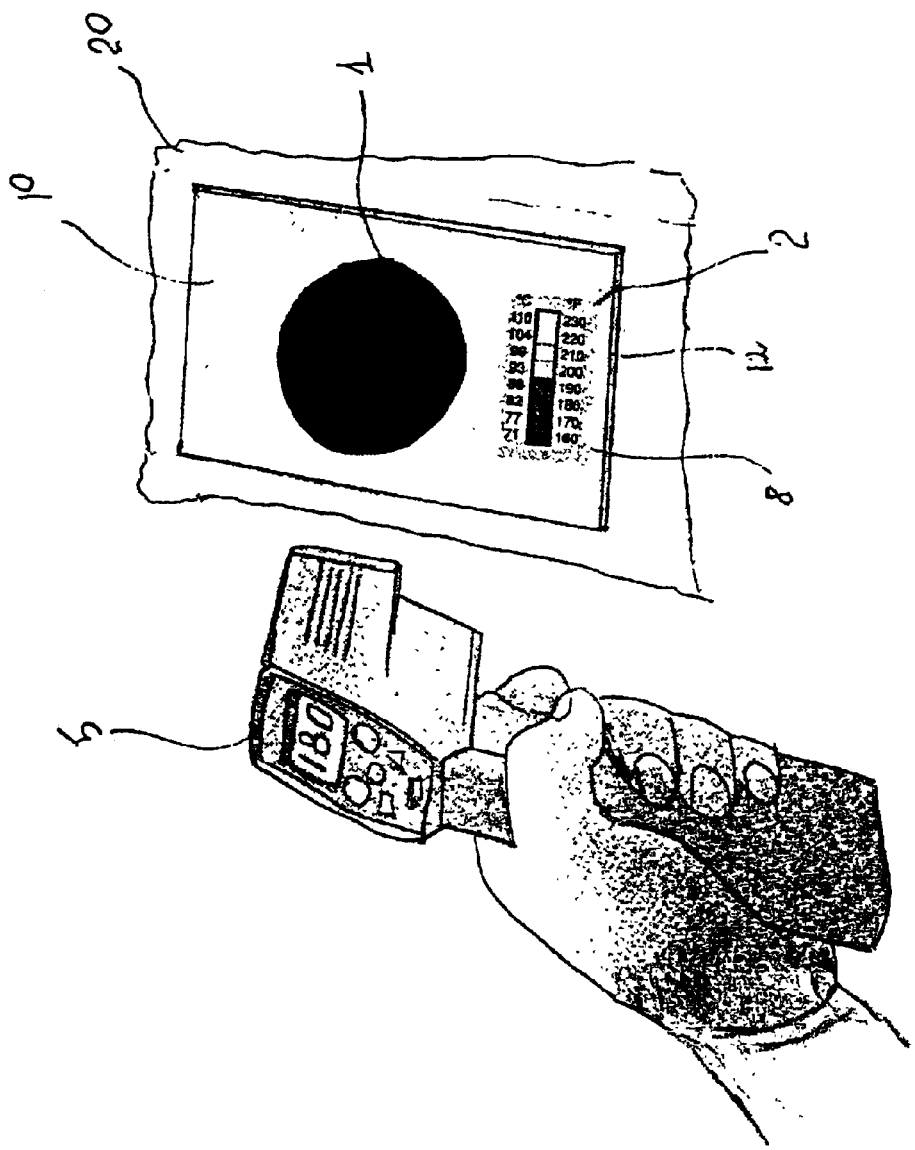
FIG. 3 illustrates the method of the present invention.

In another embodiment, the contact thermometer 2 may include a reversible liquid crystal temperature label (FIG. 2), or a color-changing temperature indicator (FIG. 3). Other types of conventional contact thermometers suitable for this purpose and which are well known in the art may be used.

The contact thermometer may have a magnetic coating or a thermo-conductive adhesive coating on its back side and be releasably attached to the surface 8 of the magnetic mat 10 (peelable). The removable contact thermometer may be interchanged with another contact thermometer, which may be chosen based on desired temperature range. The contact thermometer 2 may also be built-in or mounted on the front surface 8 of the mat by any means appropriate for this purpose.

A set including a plurality of removable contact thermometers for different temperature ranges may be provided by packaging the thermometers for sale with the mat or a set of mats, for which the thermometers are to be used. Each mat in the set is adapted to verify an accuracy of IR thermometers within a different temperature range. A mat and/or a thermometer is then selected by a purchaser or user in accordance with the temperature of the environment where the mat with the contact thermometer is to be used.

In another embodiment, the mat is made from a flexible sheet of a thermo-conductive material with an adhesive back surface 12 and is releasably attached for temperature verification to a surface of a non-metallic object (self-adhesive). Since the mat is self-adhesive, it can be applied to any surface, non-metallic as well as metallic when the temperature reading of an IR thermometer is verified.

In yet another embodiment, the mat is a flat rigid plate of thermo-conductive magnetic material with a black body target and a built-in unremovable contact thermometer.

In another embodiment the mat has a designated space for a contact thermometer, and a self-adhesive temperature label is applied to this spot. The temperature range of the label is chosen so as to comply with the temperature to be verified. The label is easily changed for another one with a different temperature range when the next verification temperature is within another temperature range.

The method of the present invention for verifying an accuracy of an IR thermometer is shown in FIG. 3. The drawing illustrates the verification of an IR thermometer for temperature of about 180° F.

The verification of an IR thermometer is usually provided in two points. In the preferred embodiment of the method, the first point for verification is 0° C., which is quickly verified by aiming the IR thermometer at a styrofoam cup with a mixture of crushed ice and water. The second point in the preferred embodiment is verified at the room temperature. It is the simplest way for the user to verify an IR thermometer since it does not require a temperature controlled environment. The magnetic surface 12 of the thermo-conductive mat 10 of the present invention is applied to any metallic surface 20 in a room, such as an outer surface of a refrigerator door, or a metal board. The user waits to give the contact thermometer 2 arranged on the mat 10 time to reach thermal equilibrium, which usually takes about 30 sec. to 1 min, and then aims the beam of the IR thermometer 5 at the black body target 1 on the mat 10. The reading of the IR thermometer 5 is then compared with the reading of the contact thermometer 2, which is attached to the mat 10 adjacent to the black body target 1.

For the refrigerator temperature verification, the user applies the mat with an appropriate contact thermometer to the inner wall of the refrigerator camera. For verification of the oven, freezer, etc. temperature, the mat 10 with a contact thermometer with the desired temperature range is applied to the inner wall of the equipment camera, and after a waiting period for thermal equilibrium of the contact thermometer, the beam of the IR thermometer 5 is aimed at the black body target 1 on the surface 8 of the mat.

A plurality of mats for different temperature ranges made from different thermo-conductive materials with different thermal characteristics can be provided for sale in order to enable the user to choose an appropriate mat for each particular measurement. The mats can be offered for sale in sets, which sufficiently extend the range of verified temperatures. Optionally, a set of contact thermometers for different temperature ranges adapted for use with the mats may be provided for sale. This way the method of the present invention can be utilized for temperatures of +100° C. and higher (for ovens of different types), as well as for room temperature and freezing temperatures of −20° C. and lower. Thus, the simple, lightweight, portable, low-cost temperature verification mats of the present invention can be used for verification of IR thermometers in different customer environments, such as in industrial environments, and with retail equipment, or home appliances, including ovens and freezers, etc. with equally good results.

Although the present invention has been described with reference to the preferred embodiments, it will be appreciated that the invention is not limited to the details described thereof and numerous changes and modifications will occur to those skilled in the art, and it is intended in the appended claims to cover all those changes and modifications which fall within the true spirit and scope of the present invention.

What is claimed is:

1. A portable temperature verification mat adapted to verify accuracy of an IR thermometer, comprising:
    a sheet of thermo-conductive material having first and second opposing surfaces;
    a black body target on and conformal with said first surface of said sheet adapted to be used as a source of infrared radiation for the IR thermometer; and
    a contact thermometer conformally arranged on said first surface adjacent to said black body target for comparison with reading of the IR thermometer focused on the target.

2. The portable mat of claim 1, wherein said second surface is generally flat and releasably attachable to an object having a desirable temperature for temperature verification.

3. The portable temperature verification mat of claim 2, wherein the contact thermometer is releasably attached to said first surface of the sheet and interchangeable with other thermometers chosen based on desired temperature range.

4. The portable temperature verification mat of claim 3, wherein the contact thermometer is chosen from a plurality of releasably attachable contact thermometers for various temperature ranges provided by packaging for sale with the mat for which the thermometers are to be used.

5. The portable mat of claim 1, wherein the contact thermometer is a liquid crystal reversible temperature label.

6. The portable mat of claim 1, wherein the contact thermometer is a reversible color-changing temperature indicator.

7. The portable mat of claim 1, wherein a range of verified temperatures is from −25° C. to +100° C.

8. The portable mat of claim 1, wherein the range of verified temperatures is preferably from −25° C. to −3° C.

9. The portable mat of claim 1, wherein the range of verified temperatures is preferably −14° C. to +31° C.

10. The portable mat of claim 1, wherein the range of verified temperatures is preferably 0° C. to +12° C.

11. The portable mat of claim 1, wherein the range of verified temperatures is preferably +14° C. to +31° C.

12. A portable temperature verification mat adapted to verify accuracy of an IR thermometer, comprising:
    a sheet of thermo-conductive material having first and second opposing surfaces;
    a black body target on said first surface of said sheet adapted to use as a source of infrared radiation for the IR thermometer;
    a contact thermometer arranged on said first surface adjacent to said black body target for comparison with reading of the IR thermometer focused on the target; and
    wherein said second surface is generally flat and releasably attachable to an object having a desirable temperature for temperature verification; and
    wherein said second surface has a magnetized metallic coating.

13. A portable temperature verification mat adapted to verify accuracy of an IR thermometer, comprising:
    a sheet of thermo-conductive material having first and second opposing surfaces;
    a black body target on said first surface of said sheet adapted to use as a source of infrared radiation for the IR thermometer;
    a contact thermometer arranged on said first surface adjacent to said black body target for comparison with reading of the IR thermometer focused on the target;
    wherein said second surface is generally flat and releasably attachable to an object having a desirable temperature for temperature verification; and
    wherein said second surface has a thermo-conductive adhesive coating.

14. A portable temperature verification mat adapted to verify accuracy of an IR thermometer, comprising:
    a sheet of thermo-conductive material having first and second opposing surfaces;
    a black body target on said first surface of said sheet adapted to use as a source of infrared radiation for the IR thermometer;
    a contact thermometer arranged on said first surface adjacent to said black body target for comparison with reading of the IR thermometer focused on the target; and
    wherein said sheet is made from a flexible thermo-conductive magnetic material and releasably attachable to an object having a desirable temperature for temperature verification.

15. A portable temperature verification mat adapted to verify accuracy of an IR thermometer, comprising:
    a sheet of thermo-conductive material having first and second opposing surfaces;
    a black body target on said first surface of said sheet adapted to use as a source of infrared radiation for the IR thermometer;
    a contact thermometer arranged on said first surface adjacent to said black body target for comparison with reading of the IR thermometer focused on the target; and
    wherein said sheet is rigid and releasably attachable to an object having a desirable temperature for temperature verification.

16. A temperature verification device comprising a plurality of portable temperature verification mats adapted to verify accuracy of an IR thermometer, each mat adapted for a different temperature range and comprising:
    a thermo-conductive flat magnetic sheet having first and second opposing surfaces;
    a black body target on and conformal with said first surface adapted to use as a source of infrared radiation for the IR thermometer; and
    a reversible contact thermometer conformally arranged on said first surface adjacent to said black body target for comparison with reading of the IR thermometer focused on the target.

17. The device of claim 16, wherein the contact thermometer is releasably attached to the mat and chosen from a plurality of releasably attachable contact thermometers for various temperature ranges provided by packaging for sale with the device.

18. A method of verifying accuracy of an IR thermometer, comprising steps of:
    providing a thermo-conductive mat having a black body target and an adjacent contact thermometer conformably affixed thereon;
    releasably attaching the mat to an object having a desirable temperature;

aiming the IR thermometer at said black body target; and comparing reading of the IR thermometer with reading of said contact thermometer.

19. The method of claim 18, wherein a range of verified temperatures is −25° C. to +100° C.

20. The method of claim 18, wherein the range of verified temperatures is preferably −25° C. to −3° C.

21. The method of claim 18, wherein the range of verified temperatures is preferably −14° C. to +31° C.

22. The method of claim 18, wherein the range of verified temperatures is preferably +14° C. to +31° C.

23. The method of claim 18, wherein the range of verified temperatures is preferably from 0° C. to +12° C.

24. The method of claim 18, further comprising a step of changing said thermometer on the mat based on desired temperature range.

25. A method of verifying accuracy of an IR thermometer, comprising steps of:

providing a thermo-conductive mat having a black body target and an adjacent contact thermometer thereon;

releasably attaching the mat to an object having a desirable temperature;

aiming the IR thermometer at said black body target;

comparing reading of the IR thermometer with reading of said contact thermometer; and providing a plurality of mats from different thermo-conductive materials for different temperature ranges and choosing said mat based on the desirable temperature.

* * * * *